July 28, 1925.
A. W. KIPP
1,547,220
TREE INSULATOR
Filed Dec. 15, 1924
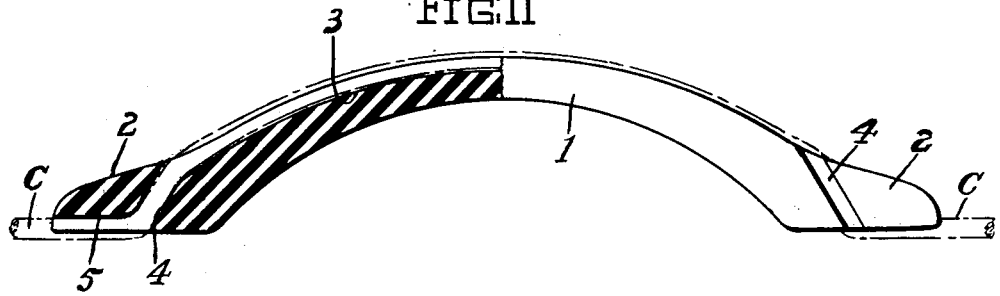
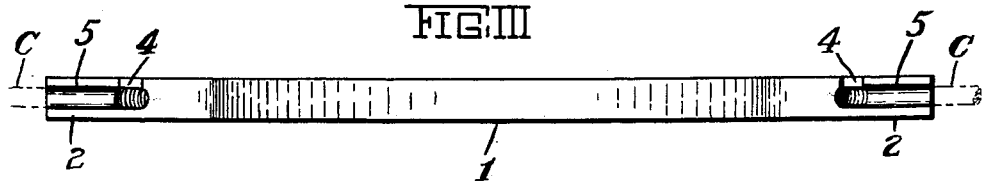
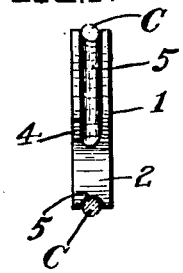
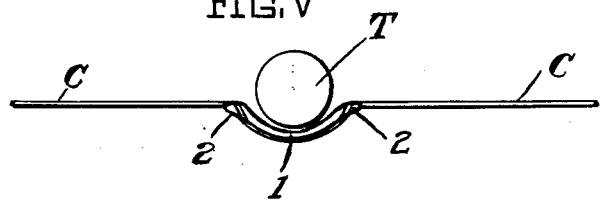
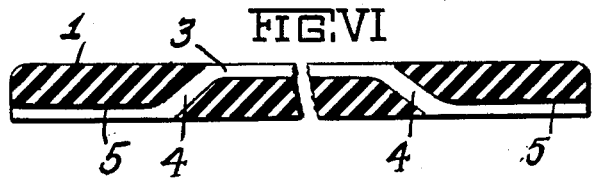
Inventor
Anson W. Kipp
By John C. Hull
Attorney Patented July 28, 1925.

1,547,220

UNITED STATES PATENT OFFICE.

ANSON W. KIPP, OF LEOMINSTER, MASSACHUSETTS.

TREE INSULATOR.

Application filed December 15, 1924. Serial No. 756,094.

*To all whom it may concern:*

Be it known that Anson W. Kipp, a citizen of the United States, residing at Leominster, county of Worcester, Commonwealth of Massachusetts, has invented certain new and useful Improvements in Tree Insulators, of which the following is a specification.

This invention relates to tree insulators adapted to deflect the current-carrying cables of electrical distribution systems past trees, posts, or other objects intervening in the direct line of the cables.

Ordinarily such insulators as have been devised for this purpose fasten to the tree itself, and in this respect are objectionable.

To the end therefore of providing a tree insulator which will avoid this objection, I have devised my present invention.

According to my invention, the tension of the taut current-carrying cable itself is utilized to effectively position the insulator relative to the intervening tree so that the cable is deflected past the tree, thus obviating the necessity of directly fastening the insulator to the tree.

My insulator is simple and inexpensive in construction, and not only effectively insulates the current-carrying cable from the tree or other intervening object, but prevents wear or chafing of the insulating cover of the cable, which chafing exposes the current wires to the tree, thereby causing the tree to become burned and a short circuit to be established in the distributing system.

These and certain other features of advantage which will appear more particularly hereinafter are secured in the device of the present invention, the construction and manner of use of which, together with a selected embodiment well illustrating the principles involved, is described and illustrated in the accompanying specification and drawings.

Throughout the specification and drawings like reference characters are correspondingly applied, and in the drawings:—

Fig. I is an outer edge view of a tree insulator in accordance with my invention.

Fig. II is a plan view, partly in section.

Fig. III is an inner edge view.

Fig. IV is an end view.

Fig. V indicates diagrammatically the deflection of a cable past a tree, post or other intervening object, relative to which the insulated deflector is effectively positioned by the tension of the cable itself, and Fig. VI is a longitudinal sectional view showing a modification.

My tree insulator is of one-piece construction and is preferably made throughout of suitable insulating material. The insulator is offset between its ends as indicated at 1 to deflect the current carrying cable C past an intervening tree or other object T, and at its ends 2 extends in the line of the cable.

The outer face of said offset portion 1 is provided with a continuous groove 3 which extends diagonally across the end portions 2 of the insulator to the inner surface thereof as indicated at 4 and thence outwardly along the inner faces of said end portions as indicated at 5 to permit the cable C to be inserted thereinto. The current carrying cable C is lodged within the groove 3 as shown in the several figures of the drawings, and is thus deflected past the tree.

By this construction I avoid the necessity of otherwise fastening the deflector to the tree T, the twist in the taut cable C imparted by the offset groove 3 being relied upon to position the insulator properly with respect to the tree T. With my insulator, therefore, the cable is not only sufficiently offset to pass a tree or other intervening object, but both the tree and cable are protected from injury, and short circuits in the distributing system avoided, all in a construction wherein the cable itself is utilized to support the insulator.

As an alternative form which may be used under certain conditions of service, the insulator extends in a straight line from end to end, (see Fig. VI) and is provided with a cable-receiving groove similar to that shown in Figs. I to V, inclusive, such groove extending along the outer face of the insulator and crossing adjacent the ends thereof to the inner face of the insulator and thence outwardly along said inner face to the ends of the insulator.

In both forms, the cable itself solely supports the insulator relative to the tree, thus avoiding the use of special fastenings.

While I have discussed my invention as a tree insulator it will be understood that such treatment is purely illustrative and in no way limiting.

Various modifications in the construction of my device may obviously be resorted to without departing from the spirit of my invention, if within the limits of the appending claims.

What I therefore claim and desire to secure by Letters Patent is:

1. A cable deflector, consisting of a member grooved to receive a cable, the end portions of said groove disposed in the line of said cable and the groove between said end portions offset to deflect the cable around an object disposed in the line of the cable, the lodgment of the cable in said groove being relied upon solely to position the deflector in proper cable-deflecting relation to the object around which the cable is to be deflected.

2. A deflector comprising a member having a cable retaining guideway continuously from end to end thereof, the ends of said guideway being disposed substantially in alinement with each other and on the inner surface of said member and the intermediate portion of said guideway being offset relative to said ends and extending along the outer surface of said member so as to deflect a portion of the cable lodged within said guideway out of the line of the cable and thereby anchor the cable and deflector against relative longitudinal movement, the lodgment of the cable itself in said guideway positioning said deflector in proper cable-deflecting relation to the tree or other object around which the cable is to be carried.

3. A cable deflector comprising a member having a cable retaining guideway, the end portions of said guideway being disposed in the line of the cable, and said guideway between its ends being offset to deflect the cable around an object disposed in the line of the cable and the deflection of the cable anchoring the cable against longitudinal movement in said guideway, the lodgment of the cable in said guideway being relied upon solely to position the deflector in proper cable deflecting relation to the object around which the cable is to be deflected.

In testimony whereof I affix my signature in presence of two witnesses.

ANSON W. KIPP.

Witnesses:
RALPH R. HARRIS,
CLAIRE E. S. WRAY.